Dec. 26, 1950         A. L. CRESCI         2,535,841
DUMP TRUCK CHUTE SUPPORT
Filed Dec. 11, 1945         2 Sheets-Sheet 1
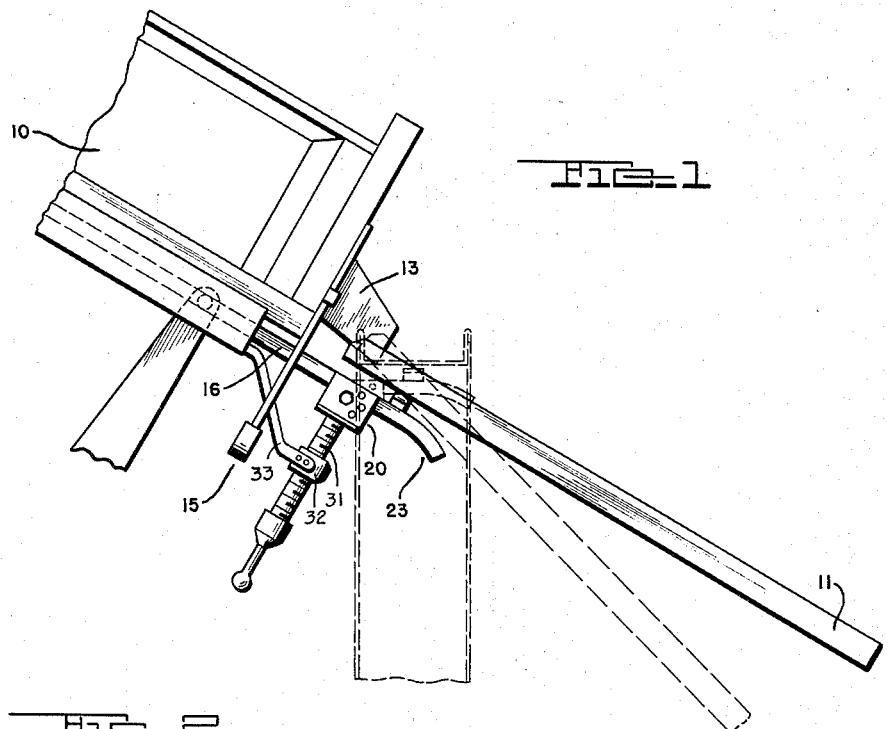
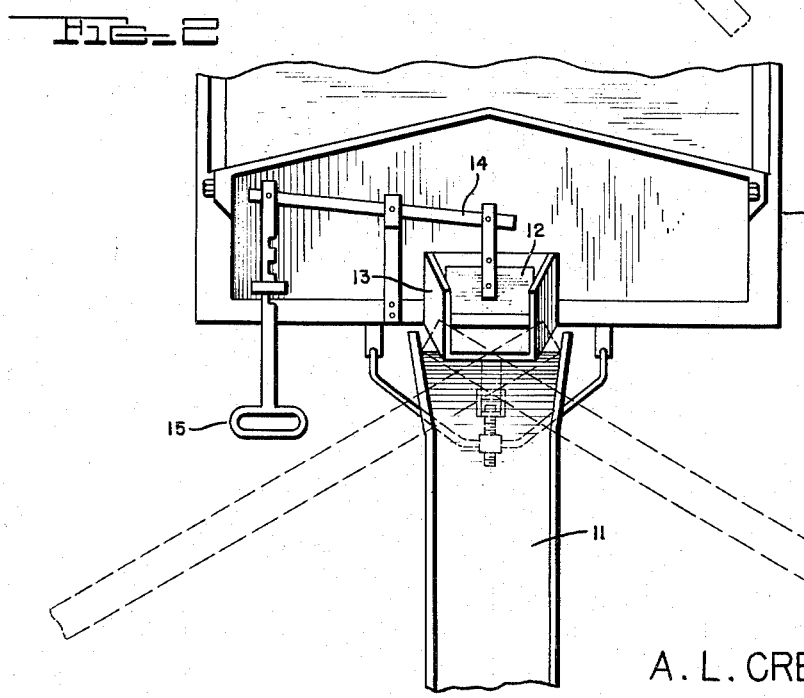
Inventor
A. L. CRESCI
By Whittemore, Hulbert & Belknap
Attorneys

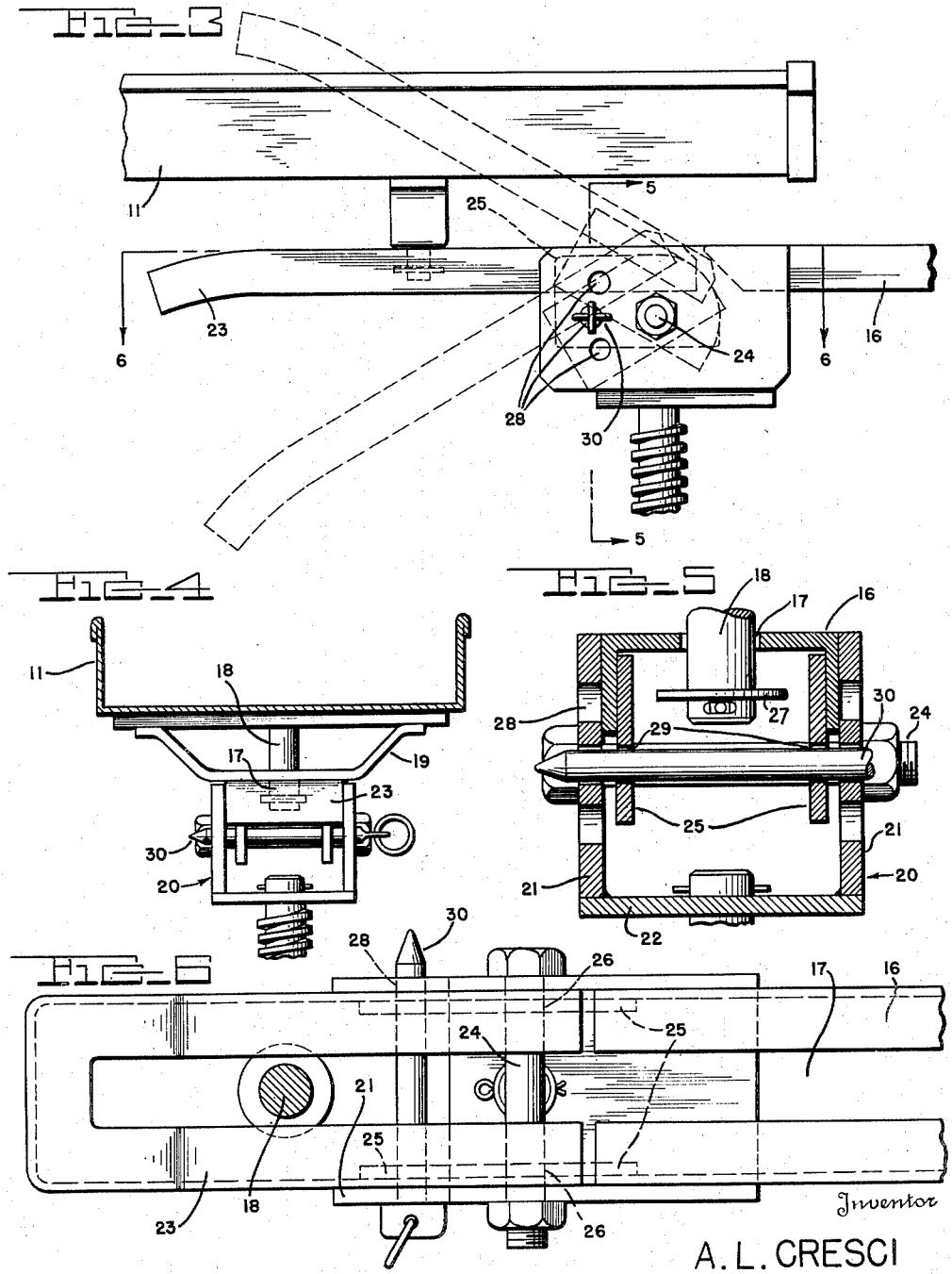

Patented Dec. 26, 1950

2,535,841

UNITED STATES PATENT OFFICE 2,535,841

DUMP TRUCK CHUTE SUPPORT

Anthony L. Cresci, Vineland, N. J.

Application December 11, 1945, Serial No. 634,321

1 Claim. (Cl. 298—7)

This invention relates to a support for chutes employed with dump vehicles, particularly with respect to chutes such as those attached to vehicles for transporting and unloading coal and similar materials.

Because of space restrictions and the location of openings in buildings or streets, it is frequently necessary, when unloading coal, to position the chute with respect to the vehicle in such a way that their longitudinal center lines are out of alignment. The vehicle body being tilted, and the chute being supported at its upper end by the body, it is difficult to support the chute properly, that is, in a position which will insure passage of the coal through the discharge gate of the body onto the chute without spilling some of the coal.

It is one of the objects of the present invention to provide an adjustable support on the vehicle body for holding the upper or receiving end of a chute, the support being so mounted that it may be adjusted to varying angles to permit misalignment of the body and chute center lines and at the same time being adapted so to position the chute that the surface of the receiving end thereof will be substantially horizontal.

It is a further object of the invention to provide a chute support which will effectively receive and guide material discharged thereinto, regardless of the angle at which the chute is disposed with respect to the vehicle body, not only when the chute and body are misaligned, but also when they are in alignment.

Another object of the invention is to provide a combined track and support, the track permitting the chute to be moved under the body when not in use and having a pivoted portion cooperating therewith to act as a support when the chute is in use.

Other objects of the invention will be apparent from the following description and the accompanying drawings of a preferred form thereof in which Fig. 1 is a side elevation of the chute support illustrating its relation to a vehicle body and to a chute attached thereto;

Fig. 2 is a partial rear elevation of a vehicle body and a chute supported in receiving relation thereto;

Fig. 3 is a fragmentary side elevation of the support and chute;

Fig. 4 is an end view partly in section of the support shown in Fig. 3;

Fig. 5 is an enlarged sectional view taken on line 5—5 of Fig. 3; and

Fig. 6 is a sectional view of the support taken on line 6—6 of Fig. 3, the guide track to which it is attached being partially shown.

In Figs. 1 and 2 of the drawings, the vehicle body 10 is shown in its tilted position with a chute 11 in receiving position beneath a gate 12 and delivery spout 13. The gate is adapted to be opened by lever 14 having a handle 15 attached thereto. Fixed beneath the body centrally thereof is a guide track 16 having a longitudinal slot 17 to accommodate post 18, the latter being secured to the chute and steadied by bracket 19 which is welded to the underside of the chute. Bracket 19 also holds the chute in spaced relation to track 16. It will thus be seen that the chute is slidable under the body and is guided by the track and by post 18 so that the chute may be stored under the body when not in use but may be pulled out from under the body when material is to be received and conveyed thereby.

Secured to the end of track 16 by welding or otherwise is a bracket 20 comprising side plates 21 and bottom plate 22. Extension 23 of the track is separate from the track but is aligned therewith and adapted to be swung about bolt 24 passing through side plates 21. For this purpose, plates 25 are welded to extension 23, although these plates may be made integral with the extension if desired, and are provided with openings 26 through which bolt 24 also passes. Washer 27 on post 18 prevents separation of the chute and the track and its extension, but the washer is spaced sufficiently below the slot to permit some play between the chute and the extension. Obviously the chute is adapted to be swung about bolt 18 acting as a swivel connection to permit the chute to be positioned with its center line transverse to the center line of the body.

For the purpose of changing the angular relation between track 16 and extension 23, each of side plates 21 has a plurality of openings 28, these openings being equidistant from bolt 24. Plates 25 have openings 29 adapted to be aligned with a selected pair of opposite openings 28 when the extension is swung about bolt 24, and thus permit a selected angular relation between the extension and the track when pin 30 is inserted through the aligned openings.

Referring to Figs. 1, 2 and 3, the chute and extension are shown in one position in full lines and in other positions in dotted lines. In Fig. 1, two positions of the chute when aligned with the center line of the body are shown. It will be seen that the inclination of the chute may thus be changed to meet varying conditions. It will also be seen that when the body is tilted and the extension has been swung to its uppermost position, the extension is substantially horizontal. It is in this latter position of the extension that the chute is supported thereby when it is desired to deliver coal in a direction angularly with respect to the center line of the vehicle body. It will be obvious that the transverse surface of the chute will then be horizontal and will lie directly in the path of the coal being discharged through the gate and spout. Its surface in a longitudinal direction will be inclined. In this position the material being unloaded will not spill over the sides of the chute as it would if the transverse surface of the chute were inclined. As pointed out hereinbefore, the washer on the retaining bolt which holds the chute to the track is so spaced from the track that the chute adjusts itself to the foregoing conditions, the floor of the chute resting squarely on the support.

Adjustment of the track to raise or lower it with respect to the body is effected by a threaded post 31 held to the bottom plate 22 of bracket 20 and threaded in stationary nut 32 secured in fixed relation to the body by bracket 33. In this manner the chute is brought into the desired receiving relation with the delivery spout.

From the foregoing description of the invention it will be apparent that the chute may be supported in several positions, not only for the purpose of changing its inclination relative to the body but also properly to support the chute when the latter is delivering material in a direction angularly with respect to the center line of the body.

While the embodiment shown in the drawings is illustrative of one form of the invention, it is intended that the details thereof may be modified without departing from the broad idea as described herein.

Having described my invention, what I claim as new and desire to secure by Letters Patent is:

In combination with a tiltable dump body, a delivery opening therein, a guide track extending longitudinally beneath said body, a separate extension of said track aligned therewith, said track and said extension having aligned longitudinal slots, a chute having a swivel post beneath and normal to the floor of the chute, said post being positioned in and slidable along said slots, means on said post to prevent separation of the chute from said track and extension, said last mentioned means permitting limited vertical movement of the chute relative to said track and extension, means on said track extending transversely thereof for pivoting said extension thereto, and cooperating means on said track and said extension for selectively locking said extension in longitudinal alignment with said track or in a plurality of vertically angular relations with respect to said track either above or below the plane of said track.

ANTHONY L. CRESCI.

REFERENCES CITED

The following references are of record in the file of this patent:

UNITED STATES PATENTS

| Number | Name | Date |
|---|---|---|
| 147,468 | Bailey | Feb. 17, 1874 |
| 539,646 | Rodenhausen | May 21, 1895 |
| 596,663 | Neuber | Jan. 4, 1898 |
| 769,898 | Gibson | Sept. 13, 1904 |
| 889,023 | Leschinski | May 26, 1908 |
| 998,724 | Townsend | July 25, 1911 |